Figure 1:
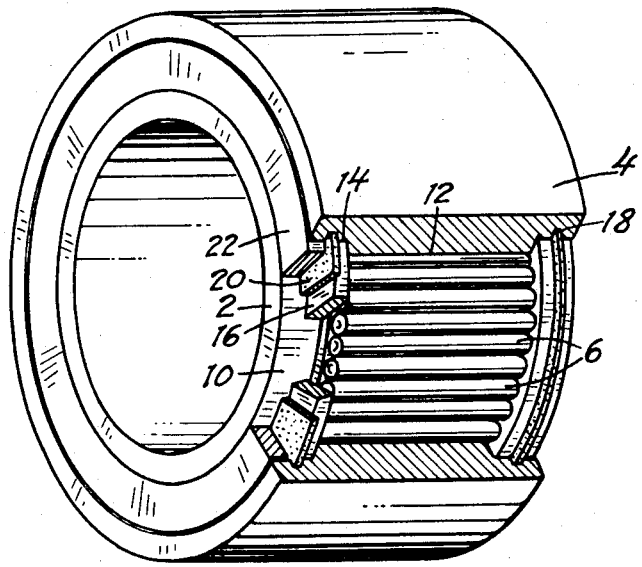

June 10, 1958   L. A. MAAS   2,838,349
NEEDLE BEARING ASSEMBLY WITH SEALING MEANS
Filed June 7, 1957

INVENTOR.
LEONHARD A. MAAS
BY Albert Sperry
ATTORNEY

United States Patent Office 2,838,349
Patented June 10, 1958

2,838,349

NEEDLE BEARING ASSEMBLY WITH SEALING MEANS

Leonhard A. Maas, Trenton, N. J., assignor to The Smith Bearing Company, Inc., Trenton, N. J., a corporation of New Jersey Application June 7, 1957, Serial No. 664,423

5 Claims. (Cl. 308—187.2)

This invention relates to roller or needle bearing assemblies and is directed particularly to constructions of this character which embody means for sealing the space between the inner and outer race members of the assembly.

It is common practice to provide ball bearing assemblies with sealing means extending across the space between the race members at opposite sides of the balls to prevent the entry of dirt or foreign matter and to reduce the loss of lubricant from the bearing. Sealing means have also been employed in roller bearing assemblies but the problems presented in such constructions are more difficult to solve, especially when the rollers are of small diameter as in the case of needle bearings. In such assemblies the space between the race members is limited and at least one of the members must be provided with thrust means which are generally located at opposite sides of the race to prevent undesired endwise movement of the rollers. When the thrust means thus provided projects beyond the bearing surface on the other race member, which is quite common practice, the adjacent surfaces of the race members overlap with the result that the placement and retention of sealing means therebetween is most difficult.

In accordance with the present invention, needle or roller bearings are provided with sealing means which are simple in construction and easy to apply and remove and yet provide an effective seal between the race members. These advantages are preferably attained by the use of nylon or other plastic or flexible sealing rings which are gripped at one edge by the thrust means carried by one of the race members while the opposite edges of the rings project into slots or annular recesses in the other race member. The sealing rings thus are arranged to extend across the space between the race members while presenting both a labyrinth and a wiping type of sealing action between the members precluding the entry of foreign matter and reducing the loss of lubricant from between the race members under all conditions of usage.

The principal object of the invention is to assure more effective sealing of roller and needle bearing assemblies while simplifying the construction and ease of assembly thereof.

Another object of the invention is to provide roller bearing assemblies with sealing means which afford both a labyrinth and a wiping type of sealing action between the race members.

A specific object of the invention is to provide a needle bearing with thrust means located at opposite sides of the bearing race and sealing means in the form of flexible sealing rings which are gripped at one edge by the thrust means and have the opposite edges thereof extending into a slot in the other race member.

These and other objects and features of the present invention will appear from the following description thereof wherein reference is made to the figures of the accompanying drawing.

Figure 2:
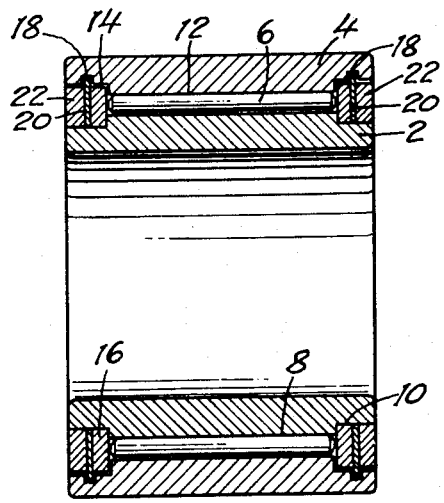

In the drawing:

Fig. 1 is a perspective illustrating a typical needle bearing assembly embodying the present invention with parts broken away; and Fig. 2 is a transverse sectional view through the construction shown in Fig. 1.

In that form of the invention chosen for purposes of illustration in the drawing, the roller bearing assembly comprises an inner race member 2 and an outer race member 4 together with a complement of needles 6. The inner race member 2 is provided with an annular bearing surface or race 8 over which the needles 6 roll and is formed at opposite sides of the race 8 with counter-bored shoulders 10. The outer race member 4 is similarly provided with an annular race 12 against which the needles 6 bear and is formed at its outer edge with a counter-bored shoulder 14.

The sealing means of the present invention is arranged to be positioned between the shoulders 10 and 14 at opposite sides of the inner and outer races 8 and 12, respectively. For this purpose, the sealing means includes a thrust ring 16 which preferably has a pressed or shrunk fit against the shoulder 10 and is spaced a short distance from the shoulder 14 so as to provide suitable clearance for free relative rotation of the inner and outer race members. At the same time, the thrust ring extends across the space between the races 8 and 12 so as to limit or prevent undue transverse movement of the needles 6 during operation.

The shoulder 14 of the outer race member 4 is formed on its inwardly facing surface with a slot or groove 18 into which the outer free edge of a flexible sealing ring 20 extends. A retaining ring 22 is seated against the shoulder 10 on the inner race member 2 and engages the ring 20 so as to clamp the flexible sealing ring in place. the retaining ring 22 is preferably also pressed or shrunk onto shoulder 10 so as to be securely attached to the inner race member. In this way the thrust ring 16, sealing ring 20 and retaining ring 22 form in effect a unitary structure positively secured to the inner race member 2 and extending across the needle receiving space between the races 8 and 12.

The sealing ring 20 preferably is formed of nylon or other flexible plastic material and the thrust ring 16 is of such thickness that when seated firmly against the shoulder 10 of the inner race member 2, the inner face of the sealing ring 20 will tend to bear lightly against the inner side of the slot 18. The sealing ring 20 preferably has a thickness somewhat less than the width of the slot 18 so that at least limited lateral movement of the inner and outer race members may occur without undue flexing of the free outer edge portion of the sealing ring.

The construction thus provided affords limited wiping contact between the free edge of the sealing disc 20 and the side faces of the slot 18 upon relative lateral movement of the inner and outer race members. However, the sealing disc 20 normally is spaced from the side faces of the slot 18 so as to be centered within the slot providing a labyrinth sealing passage. The seal thus provided affords a minimum of frictional contact or wear upon the sealing ring 20 and at the same time assures effective protection against the entry of foreign matter, dirt, fumes and the like into contact with the races, needles and other bearing surfaces of the assembly. While the seal provided is normally of a labyrinth type, it is actually improved or made positive upon transverse displacement of the race members in that the sealing rings then have a wiping contact with the sides of slot 18 in the outer race member. Effective sealing of the assembly is thus assured under all conditions of usage and operation of the bearing assembly.

In assembling the elements of the construction described, the inner and outer race members and the needles 6 may be assembled in a conventional manner after which the thrust rings 16 may be press fitted against the shoulders 10 at opposite sides of the race. The sealing rings 20 then are positioned against the outer faces of the thrust rings 16 with the outer free edges of the rings extending into the slot 18 in the outer race member 2. Thereafter the retaining rings 22 are press fitted or shrunk onto the shoulders 10 and against the sealing rings 20 so as to clamp the sealing rings tightly in place upon the inner race member 2.

When disassembly of the bearing is necessary or replacement of the sealing ring 20 is desirable, the sealing means may be removed by pressing off the retaining and thrust rings. If only the sealing ring 20 is to be replaced, only the retaining ring 22 and the sealing ring 20 need be removed.

While the construction shown in the drawings is arranged to secure the sealing means to the inner race 2, it will be apparent that the sealing means may be carried by the outer race 4, and in that event, the shoulder 10 of the inner race member will be provided with a slot corresponding to the slot 18 shown in the figures of the drawing. The construction is thus applicable to various types of needle bearing assemblies and to assemblies having a wide range of application.

While a preferred form of the present invention has been illustrated in the drawing and described above, it will be apparent that numerous changes and modifications may be made in the form, construction and arrangement of the elements of the combination. In view thereof it should be understood that the particular form of the invention shown and described is intended to be illustrative only and is not intended to limit the scope of the invention.

I claim:

1. A roller bearing assembly comprising an inner race member having a bearing race thereon, an outer race member with a complementary race thereon, a complement of rollers located between said race members and engaging said races, a thrust ring carried by one of said race members and extending beyond the adjacent edge of the race on the other race member, a sealing ring positioned adjacent the thrust ring, and a retaining ring serving to clamp one edge of the sealing ring into fixed position with respect to the thrust ring, the opposite edge of the sealing ring projecting beyond the thrust ring and into sealing relation with the other race member.

2. A roller bearing assembly comprising an inner race member having a bearing race thereon, an outer race member with a complementary race thereon, a complement of rollers located between said race members and engaging said races, each of said race members being formed with shoulders thereon at opposite sides of the races, thrust rings carried by one of said members and having a tight fit on the shoulders thereof, sealing rings positioned adjacent said thrust rings, retaining rings cooperating with the thrust rings to grip one edge of each sealing ring to hold the sealing rings in place, the sealing rings having free edges projecting beyond the thrust rings toward the shoulders on the other race member and into sealing relation therewith.

3. A roller bearing assembly comprising an inner race member having a bearing race thereon, an outer race member with a complementary race thereon, a complement of rollers located between said race members and engaging said races, each of said race members being formed with shoulders thereon at opposite sides of the races, thrust rings carried by one of said members and having a tight fit on the shoulders thereof, sealing rings positioned adjacent said thrust rings, retaining rings cooperating with the thrust rings to grip one edge of each sealing ring to hold the sealing rings in place, the sealing rings having free edges projecting beyond the thrust rings, and the shoulders on the other race member each being provided with a slot into which the free edges of the sealing rings project.

4. A needle bearing assembly comprising an inner race member having a bearing race thereon, a complement of needle bearings engaging said race, the inner race member being counter-bored to form a shoulder at one side of said race, a thrust ring having a pressed fit on said shoulder and projecting beyond said race to limit transverse movement of the needle bearings with respect to said race, a flexible sealing ring positioned adjacent said thrust ring, a retaining ring also having a pressed fit on said shoulder and cooperating with the thrust ring to grip the inner edge of the sealing ring and secure the latter to the inner race member, the outer free edge of the sealing ring projecting beyond the outer edges of the thrust ring and retaining ring, and an outer race member surrounding the inner race member and having a race thereon engaged by the needle bearings, said outer race member having an inwardly facing slot thereon into which the free edge of the flexible sealing ring extends.

5. A needle bearing assembly comprising an inner race member having a bearing race thereon, a complement of needle bearings engaging said race, the inner race member being counter-bored to form a shoulder at one side of said race, a thrust ring having a pressed fit on said shoulder and projecting beyond said race to limit transverse movement of the needle bearings with respect to said race, a flexible sealing ring positioned adjacent said thrust ring, a retaining ring also having a pressed fit on said shoulder and cooperating with the thrust ring to grip the inner edge of the sealing ring and secure the latter to the inner race member, the outer free edge of the sealing ring projecting beyond the outer edges of the thrust ring and retaining ring, and an outer race member surrounding the inner race member and having a race thereon engaged by the needle bearings, said outer race member having an inwardly facing slot thereon into which the free edge of the flexible sealing ring extends, the position and thickness of the sealing ring with respect to the slot in the outer race member being such that the sealing ring is normally spaced from sides of the slot to provide a labyrinth seal between the race members but is engageable with a side of the slot upon relative lateral displacement of the race members to provide a wiping seal therebetween.

References Cited in the file of this patent

UNITED STATES PATENTS

| 1,776,647 | Zubler | Sept. 23, 1930 |
| 2,770,508 | Smith | Nov. 13, 1956 |